(12) United States Patent
Hoffman

(10) Patent No.: US 9,370,201 B2
(45) Date of Patent: Jun. 21, 2016

(54) POTATO PIERCING APPARATUS

(71) Applicant: Steven P. Hoffman, Lighthouse Point, FL (US)

(72) Inventor: Steven P. Hoffman, Lighthouse Point, FL (US)

(*) Notice: Subject to any disclaimer, the term of this patent is extended or adjusted under 35 U.S.C. 154(b) by 0 days.

(21) Appl. No.: 14/938,270

(22) Filed: Nov. 11, 2015

(65) Prior Publication Data

US 2016/0058044 A1 Mar. 3, 2016

Related U.S. Application Data

(63) Continuation of application No. 13/916,034, filed on Jun. 12, 2013, now Pat. No. 9,210,946.

(60) Provisional application No. 61/713,722, filed on Oct. 15, 2012.

(51) Int. Cl.
| | |
|---|---|
| *B26F 1/24* | (2006.01) |
| *A23L 1/216* | (2006.01) |
| *A23N 15/02* | (2006.01) |
| *A23N 15/00* | (2006.01) |
| *A01M 23/36* | (2006.01) |

(52) U.S. Cl.
CPC ............ *A23L 1/216* (2013.01); *A23N 15/00* (2013.01); *A23N 15/02* (2013.01); *B26F 1/24* (2013.01); *A01M 23/36* (2013.01); *Y10T 83/0252* (2015.04)

(58) Field of Classification Search
CPC .............. A23L 1/212; A23L 1/214–1/216; A01M 23/36; A23N 15/00; A23N 15/02; B26F 1/24
USPC .................. 83/373–395, 868, 866
See application file for complete search history.

(56) References Cited

U.S. PATENT DOCUMENTS

| 663,655 | A | * | 12/1900 | Foreman | A01M 23/36 43/79 |
|---|---|---|---|---|---|
| 824,319 | A | * | 6/1906 | Tolen et al. | A22C 9/008 452/143 |
| 834,495 | A | * | 10/1906 | Sandefur | A01M 23/36 43/79 |
| 857,568 | A | * | 6/1907 | Hurley | A22C 9/008 452/144 |
| 931,587 | A | * | 8/1909 | Fairbanks | A47J 37/0694 99/419 |
| 961,019 | A | * | 6/1910 | Roberts | A22C 9/008 452/141 |

(Continued)

*Primary Examiner* — Sean Michalski
(74) *Attorney, Agent, or Firm* — Glenn E. Gold; Gold & Rizvi, P.A.

(57) ABSTRACT

A potato piercer having a top assembly with a handle. The top assembly includes a first plate having a bottom surface and a plurality of piercing stakes secured to the bottom surface. The potato piercer further includes a bottom assembly having a second plate and a plurality of piercing stakes secured to the top surface of the second plate. The potato piercer has a housing sized and configured to receive a potato for piercing. The housing has a roof with a plurality of apertures for receiving the top assembly stakes, a floor with a plurality of apertures for receiving the bottom assembly stakes, and a cavity for receiving the potato. There is an actuator assembly operatively coupled to the top and bottom assemblies, whereby a force applied to the handle causes the actuator assembly to translate the potato piercer from a non-piercing configuration to a piercing configuration.

8 Claims, 16 Drawing Sheets

(56) References Cited

U.S. PATENT DOCUMENTS

| | | | | |
|---|---|---|---|---|
| 983,181 A * | 1/1911 | Tharp | A01M 23/36 | 43/79 |
| 1,382,125 A * | 6/1921 | Schroeter | A01M 23/36 | 43/80 |
| 1,543,030 A * | 6/1925 | Rhude | A01M 23/36 | 43/58 |
| 1,545,156 A * | 7/1925 | Messer | A01M 23/36 | 43/88 |
| 1,848,541 A * | 3/1932 | Norberg | A01M 23/36 | 241/231 |
| 1,996,949 A * | 4/1935 | Bosworth | A22C 9/007 | 452/146 |
| 2,009,635 A * | 7/1935 | Remlinger | A01M 23/36 | 43/80 |
| 2,054,231 A * | 9/1936 | Raymaley | B26D 1/553 | 83/102.1 |
| 2,086,826 A * | 7/1937 | Smith | A01M 23/36 | 248/156 |
| 2,149,311 A * | 3/1939 | Potts | A01M 23/36 | 43/79 |
| 2,373,781 A * | 4/1945 | Richardson | B26D 3/185 | 100/226 |
| 2,385,875 A * | 10/1945 | Moore | A01M 23/36 | 43/80 |
| 2,507,284 A * | 5/1950 | Sullivan | A01M 23/36 | 43/79 |
| 2,572,770 A * | 10/1951 | Shadduck | B26D 3/185 | 83/435.15 |
| 2,589,385 A * | 3/1952 | Howrey | A01M 23/36 | 43/80 |
| 2,594,174 A * | 4/1952 | Johnson | A22C 9/00 | 15/200 |
| 2,707,651 A * | 5/1955 | Ott | A47J 17/10 | 294/61 |
| 3,417,799 A * | 12/1968 | Swanson | A47J 17/20 | 15/3.14 |
| 3,661,072 A * | 5/1972 | Allinquant | A22C 17/0053 | 99/532 |
| 3,687,688 A * | 8/1972 | Stapley | A23L 1/2163 | 426/102 |
| 3,772,737 A * | 11/1973 | Fleiss | A22C 9/008 | 452/146 |
| 3,991,439 A * | 11/1976 | Wagner | A22C 9/008 | 452/141 |
| 4,027,356 A * | 6/1977 | Wagner | A22C 9/008 | 452/141 |
| 4,199,841 A * | 4/1980 | Jaccard | A47J 43/28 | 30/305 |
| 4,217,817 A * | 8/1980 | Meamber | A47J 37/067 | 452/144 |
| 4,242,774 A * | 1/1981 | Massaro | A22C 9/008 | 452/144 |
| 4,257,144 A * | 3/1981 | Takegoshi | A22C 9/008 | 452/146 |
| 4,338,701 A * | 7/1982 | d'Arras | A22C 9/008 | 452/141 |
| 4,437,207 A * | 3/1984 | Ross | A22C 9/008 | 452/141 |
| 4,463,476 A * | 8/1984 | Jaccard | A22C 9/008 | 452/146 |
| 4,625,607 A * | 12/1986 | Maillez | B26D 1/30 | 30/114 |
| 4,858,373 A * | 8/1989 | Combs | A01M 23/36 | 43/61 |
| 4,870,717 A * | 10/1989 | Hirano | A22C 9/008 | 452/147 |
| 4,896,011 A * | 1/1990 | Trucks | A47J 43/18 | 219/720 |
| 5,085,614 A * | 2/1992 | Bourret | A22C 9/008 | 452/141 |
| 5,525,102 A * | 6/1996 | Jaccard | A22C 9/008 | 452/141 |
| 5,638,744 A * | 6/1997 | Smith | A23B 4/28 | 99/487 |
| 5,844,215 A * | 12/1998 | Deal | A47J 43/283 | 219/732 |
| 6,135,873 A * | 10/2000 | Jaccard | A22C 9/00 | 411/221 |
| 6,159,090 A * | 12/2000 | Thompson | A22C 9/008 | 452/141 |
| 6,802,152 B2 * | 10/2004 | Hagen | A01M 27/00 | 43/78 |
| 6,869,351 B1 * | 3/2005 | Kell | A22C 9/008 | 452/141 |
| 6,908,375 B1 * | 6/2005 | Kadhim | A47J 43/16 | 206/216 |
| D521,820 S * | 5/2006 | Kujawski | A22C 9/00 | D7/682 |
| 7,037,186 B2 * | 5/2006 | Lagares Corominas | A22C 9/00 | 452/144 |
| 7,076,913 B1 * | 7/2006 | Dow | A01M 31/002 | 43/77 |
| 8,042,299 B1 * | 10/2011 | Brown, Jr. | A01M 23/36 | 43/77 |
| 8,578,827 B1 * | 11/2013 | Jaroche | B25B 5/06 | 144/278.1 |
| D717,128 S * | 11/2014 | Gorowski | A22C 9/00 | D7/682 |
| 8,888,570 B2 * | 11/2014 | Doyle | A22C 9/001 | 452/141 |
| 2003/0064673 A1 * | 4/2003 | Bobrowski | A22C 9/008 | 452/141 |
| 2004/0094645 A1 * | 5/2004 | Kujawski | A22C 9/008 | 241/283 |
| 2004/0261634 A1 * | 12/2004 | Wang | A47J 17/16 | 99/584 |
| 2005/0239388 A1 * | 10/2005 | Gorowski | A22C 9/008 | 452/141 |
| 2008/0035772 A1 * | 2/2008 | Ferencik | A22C 9/008 | 241/168 |
| 2008/0206421 A1 * | 8/2008 | Debon | A23L 1/212 | 426/524 |
| 2008/0314262 A1 * | 12/2008 | Stark | A47J 17/16 | 99/595 |
| 2009/0111367 A1 * | 4/2009 | Bolzacchini | A22C 9/008 | 452/141 |
| 2010/0031555 A1 * | 2/2010 | Le Laidier | A01M 23/36 | 43/77 |
| 2011/0192290 A1 * | 8/2011 | Hauser | B26D 3/283 | 99/537 |
| 2012/0000114 A1 * | 1/2012 | Clark | A01M 27/00 | 43/80 |
| 2014/0020278 A1 * | 1/2014 | Smith | A01M 23/36 | 43/79 |

* cited by examiner

POTATO PIERCING APPARATUS

CROSS-REFERENCE TO RELATED APPLICATION

This U.S. non-provisional patent application is a continuation of co-pending U.S. non-provisional patent application Ser. No. 13/916,034, filed on Jun. 12, 2013, which, in turn, claims the benefit of U.S. provisional patent application No. 61/713,722 (now expired), filed on Oct. 15, 2012, both of which are incorporated-by-reference herein in their entireties.

FIELD OF THE INVENTION

The invention relates generally to food preparation devices. More particularly, a potato piercing apparatus is provided that can quickly and safely pierce potatoes in preparation for baking, boiling, microwaving and frying.

BACKGROUND OF THE INVENTION

Potatoes, of which there are well over one-thousand varieties, are starchy, edible tubers native to the South American Andes. Potatoes were introduced outside the Andes region over four hundred years ago and in that relatively short time has become one of the world's major food crops, following only rice, wheat, and corn. Reasons for this are that potatoes are nutritious, flavorful, and hardy. Potatoes can survive rough handling, can be stored for extended periods of time in a proper environment, and can grow in a very wide range of conditions and soils. Compared to most other crops potatoes take less land, effort, and money to grow sufficient food to feed a family.

Potatoes can be baked, stuffed, boiled, microwaved, fried, thrown on hot coals or placed under burning logs. They are suitable for appetizers, side dishes, and main dishes. They complement a very wide range of other food stuffs and can be served in a variety of ways.

One of the more challenging tasks associated with cooking potatoes is the pre-cooking preparation of the potato itself, which may require peeling the skin, as well as cubing, mashing and slicing the potato. Due to the relative firmness of potatoes, such preparatory actions usually require the use of knives, slicers, peelers and other hardware. Alternatively, pre-cooking preparation may merely involve puncturing the potato to facilitate the release of built up steam during subsequent heating of the potato. This is usually performed by introducing a set, or series, of punctures by piercing the potato with a rigid object. In this manner, as the potato is baked, microwaved or otherwise prepared, steam generated inside the potato is released via the punctures.

The traditional method of piercing potatoes is to simply jab fork tines into the potato. This traditional method of creating punctures through a potato has a number of significant drawbacks. For instance, using a fork with only a few fork tines may require the food preparer to manually force the fork tines into the potato multiple times to create a sufficient quantity of punctures. Furthermore, a food preparer's hands will tire very quickly piercing potatoes with fork tines. Moreover, there is a high risk that forks will be inadvertently bent, and there is a high risk of harm to the food preparer. In addition uniform cooking generally requires uniformly-spaced punctures, which is not likely to happen simply by using fork tines.

In view of the foregoing, there remains a need for a flexible, easy to use device for piercing potatoes. Beneficially, such a device would be both fast and safe. Preferably, such a device would also be suitable for low cost implementations and for uniformly puncturing potatoes.

SUMMARY OF THE INVENTION

The present invention provides for a flexible, easy to use device for piercing potatoes. The present invention is suitable for easy, safe operation. Moreover, it is highly flexible, can quickly produce relatively uniform punctures, and is suitable for low cost implementation.

In accordance with one aspect of the present invention, there is provided a potato piercer comprising a base assembly having a left vertical side with a left guide bore, a right vertical side with a right guide bore, a bottom between the left and right vertical sides, and a plurality of upwardly directed piercing stakes. The potato piercer further includes a movable top assembly having a top, a left guide rod that extends into the left guide bore, a right guide rod that extends into the right guide bore, a handle, and a plurality of downwardly directed piercing stakes. The left and right guide rods respectively slide along the left and right guide bores and are dimensioned to enable a potato to be placed between the upwardly directed piercing stakes and the downwardly directed piercing stakes. The handle and the left guide rod and the right guide rod enable the top to move toward the bottom such that a potato placed between the upwardly directed piercing stakes and the downwardly directed piercing stakes is pierced.

In another aspect of the potato piercer, there is provided a fixed base assembly having a left vertical side with at least one left guide bore, a right vertical side with at least one right guide bore, and a fixed bottom plate disposed between the left and right vertical sides. A base cover having a plurality of bottom orifices is disposed over the fixed bottom plate. A plurality of bottom piercing stakes extends upward from the bottom plate through the bottom orifices. A movable bottom plate is disposed between the base cover and the fixed bottom. The movable bottom plate has plurality of bottom cylinders through which the bottom piercing stakes pass. A plurality of bottom springs around the bottom piercing stakes bias the movable bottom plate upward.

In yet another aspect, the potato piercer includes a movable top assembly that includes a top housing defining a top cavity above a fixed top plate configured with a plurality of top orifices. The movable top assembly includes at least one left guide rod extending into the at least one left guide bore and at least one right guide rod extending into the at least one right guide bore. A handle is attached to the top housing and a plurality of top piercing stakes pass through the top cavity and the plurality of top orifices. A movable top plate within the top cavity has a plurality of top cylinders through which the top piercing stakes pass. A plurality of bottom springs around the top piercing stakes bias the movable top plate downward.

In another aspect, there is provided a food piercing apparatus, comprising:

a plurality of walls forming a housing cavity, wherein the housing cavity is configured having a size and shape for receiving and staging a food item, and a plurality of piercing member receiving apertures passing through at least one of the plurality of walls, wherein the piercing member receiving apertures are located in a spatially arranged pattern; and a plate assembly including a plate having a planar surface and a plurality of piercing members extending from the planar surface in a spatially arranged pattern wherein each piercing member is provided in registration with a respective piercing member receiving aperture and the piercing members are substantially parallel with one another; and an actuator assembly operatively coupled to the plate assembly, the actuator assembly being configured to translate the plate assembly between a first position and a second position, the first position being a non-piercing configuration wherein the plurality of piercing members are positioned externally of the housing cavity, and the second position being a piercing configuration wherein the plurality of piercing members are urged through the plurality of piercing member receiving apertures, such that a majority of a length of each of the plurality of piercing members are positioned within the cavity.

In another aspect, the spatially arranged pattern of the plurality of piercing member receiving apertures and the spatially arranged pattern of the plurality of piercing members are the same.

In another aspect, each of the plurality of piercing members is fabricated of an elongated member having a sharpened distal end, wherein the sharpened distal end is oriented in the direction of a central region of the housing cavity.

In another aspect, the plate assembly further comprises a grip, wherein, during operation of the food piercing apparatus, a force applied to the grip urges the actuator assembly to move between the first position and the second position.

In another aspect, the grip is in the form of a handle.

In another aspect, the food piercing apparatus further comprises a biasing member positioned between the plate and the wall comprising the apertures, wherein the biasing member biases the plate assembly away from the food item housing such that when the force is removed from the food piercing apparatus when the food piercing apparatus is in the second position, the plate assembly is automatically returned to the first position.

In another aspect, the biasing member is a spring.

In yet another aspect, there is provided a food piercing apparatus, comprising:

a food item housing comprising a first wall having a plurality of first-wall piercing member receiving apertures passing through the first wall, wherein the first-wall piercing member receiving apertures are located in a first spatially arranged pattern, a second wall having a plurality of second-wall piercing member receiving apertures passing through the second-wall, wherein the second-wall piercing member receiving apertures are located in a second spatially arranged pattern, and a housing cavity formed by the first wall and second wall, wherein the housing cavity is configured having a size and shape for receiving and staging a food item;

a top plate assembly including a first plate having a first planar surface and a plurality of first-plate piercing members extending from the first planar surface in the first spatially arranged pattern wherein each first-plate piercing member is provided in registration with a respective first-wall piercing member receiving aperture and each first-plate piercing member is substantially parallel with one another;

a bottom plate assembly including a second plate having a second planar surface and a plurality of second-plate piercing members extending from the second planar surface in the second spatially arranged pattern wherein each second-plate piercing member is provided in registration with a respective second-wall piercing member receiving aperture and each second-plate piercing member is substantially parallel with one another; and an actuator assembly operatively coupled to opposing sides of the top plate assembly and the bottom plate assembly, the actuator assembly comprising a first link arm and a second link arm pivotally connected by a pivot pin, wherein the pivot pin is centrally positioned along a length of each link arm and wherein the actuator assembly is configured to move the top plate assembly and the bottom plate assembly between a first position and a second position, the first position being a non-piercing configuration wherein the plurality of first-plate and second-plate piercing members are positioned exterior to the housing cavity and the second position being a piercing configuration wherein the plurality of first-plate piercing members are moved through the plurality of first-wall piercing member receiving apertures and the plurality of second-plate piercing members are moved through the plurality of second-wall piercing member receiving apertures, such that the plurality of first-plate and second-plate piercing members are positioned within the cavity.

In another aspect, the first and second spatially arranged patterns are the same.

In another aspect, each of the plurality of first-wall and second-wall piercing members is fabricated of an elongated member having a sharpened distal end, wherein the sharpened distal end is oriented being directed towards a central region of the housing cavity.

In another aspect, the top plate assembly further comprises a grip, wherein, in operation, a force is applied to the grip that urges the actuator assembly to move between the first position and the second position.

In another aspect, there is provided a plurality of biasing members positioned between the first plate and the first wall and between the first plate and the second wall, wherein the biasing members bias the top and bottom plate assemblies away from the food item housing such that when the force is removed from the food piercing apparatus when the food piercing apparatus is in the second position, the top and bottom plate assemblies are automatically returned to the first position.

In another aspect, the plurality of biasing members are springs.

In yet another aspect, there is provided a potato piercing apparatus comprising:

a top plate assembly including a first plate having a bottom surface and a plurality of first-plate piercing members secured to the bottom surface of the first plate;

a bottom plate assembly including a second plate having a top surface and a plurality of second-plate piercing members secured to the top surface of the second plate;

a potato housing comprising a first wall having a first-wall first side and a first-wall second side with a plurality of first-wall through-going apertures from the first-wall first side to the first-wall second side, a second wall having a second-wall first side and a second-wall second side with a plurality of second-wall through-going apertures from the second-wall first side to the second-wall second side; and a housing cavity sized and configured to receive a potato; and an actuator assembly operatively coupled to the top plate assembly and the bottom plate assembly, the actuator assembly being configured to translate the top plate assembly and the bottom plate assembly between a first position and a second position, the first position being a non-piercing configuration wherein the plurality of first-plate and second-plate piercing members are positioned exterior to the housing cavity and the second position being a piercing configuration wherein the plurality of first-plate and second-plate piercing members are moved through the plurality of through-going openings, such that the plurality of piercing members are positioned within the cavity.

In another aspect, each of the plurality of first-wall through-going apertures is adapted to receive each of the plurality of first-plate piercing members such that each of the plurality of first-plate piercing members is able to slide through each of the plurality of first-wall through-going apertures when the actuator assembly is moved between the first position and the second position; and wherein each of the plurality of second-wall through-going apertures is adapted to receive each of the plurality of second-plate piercing members such that each of the plurality of second-plate piercing members is able to slide through each of the plurality of second-wall through-going apertures when the actuator assembly is moved between the first position and the second position.

In another aspect, each of the plurality of first-plate and second-plate piercing members is an elongated member having a sharpened distal end and wherein the sharpened distal end is oriented towards a central region of the housing cavity.

In another aspect, there is provided a grip integrated into the top plate assembly, wherein a force applied to the grip causes the actuator assembly to move between the first position and the second position.

In another aspect, a plurality of biasing members positioned between the first plate and the first wall and between the second plate and the second wall, wherein the biasing members bias the top and bottom plate assemblies away from the food item housing such that when the force is removed from the food piercing apparatus in the second position, the top and bottom plate assemblies are automatically returned to the first position.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, in which.

Like reference numerals refer to like parts throughout the several views of the drawings.

DETAILED DESCRIPTION

The following detailed descriptions are exemplary only and are not intended to limit the invention or its application. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A first exemplary embodiment of a potato piercer 100 that is in accord with the principles of the present invention is presented in FIGS. 1 through 8. The potato piercer 100 is an apparatus that is designed to pierce a potato, as illustrated in FIG. 9. Although the potato piercer 100 presents a first exemplary embodiment, it is understood that the concept can be adapted in any suitable form factor, such as a potato piercer 200 illustrated in FIG. 10 and a potato piercer 300 illustrated in FIGS. 11 through 16.

Figure 1:
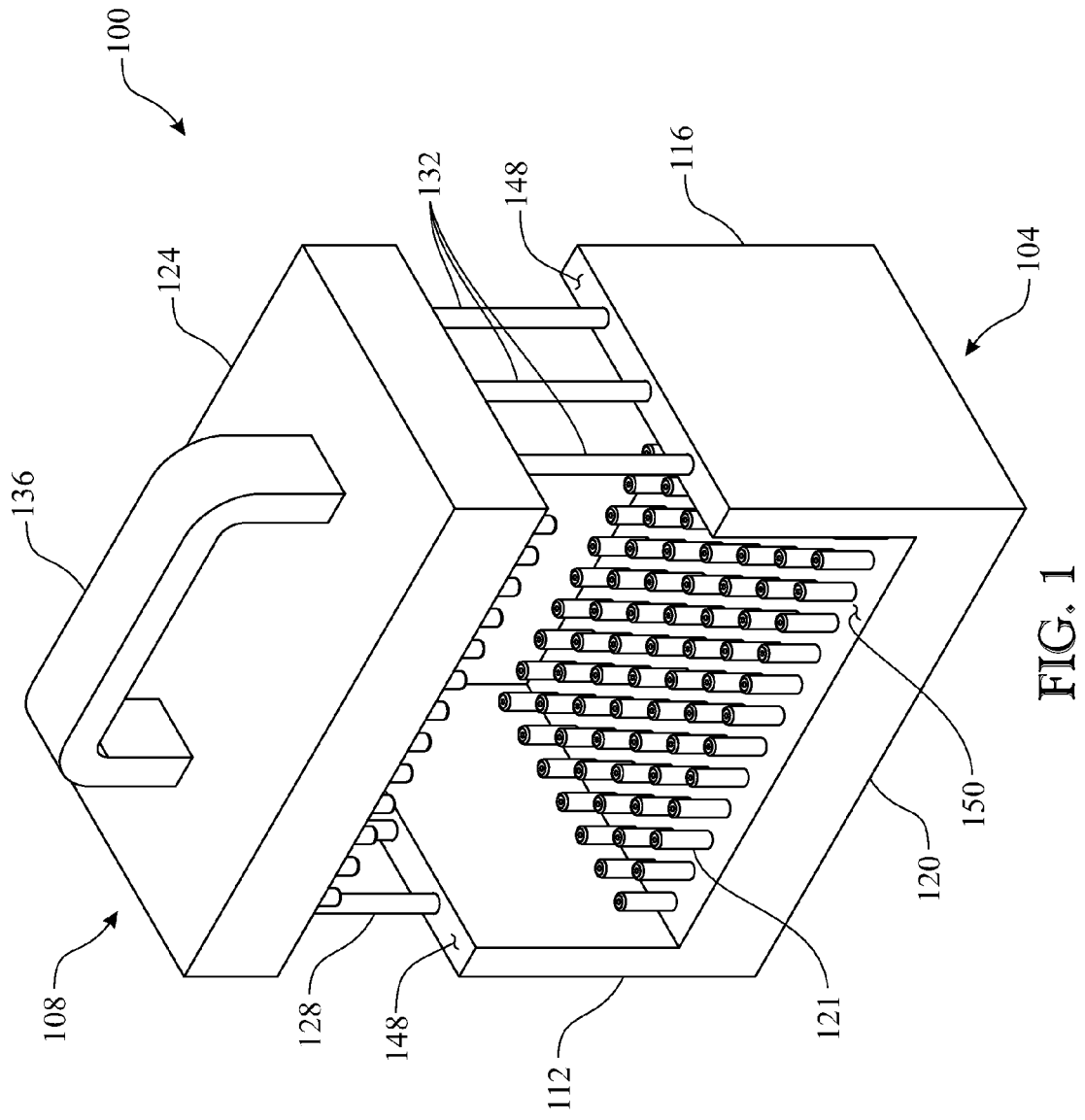
FIG. 1 presents an isometric view of a first exemplary embodiment of a potato piercer that is in accord with the principles of the present invention.
Figure 6:
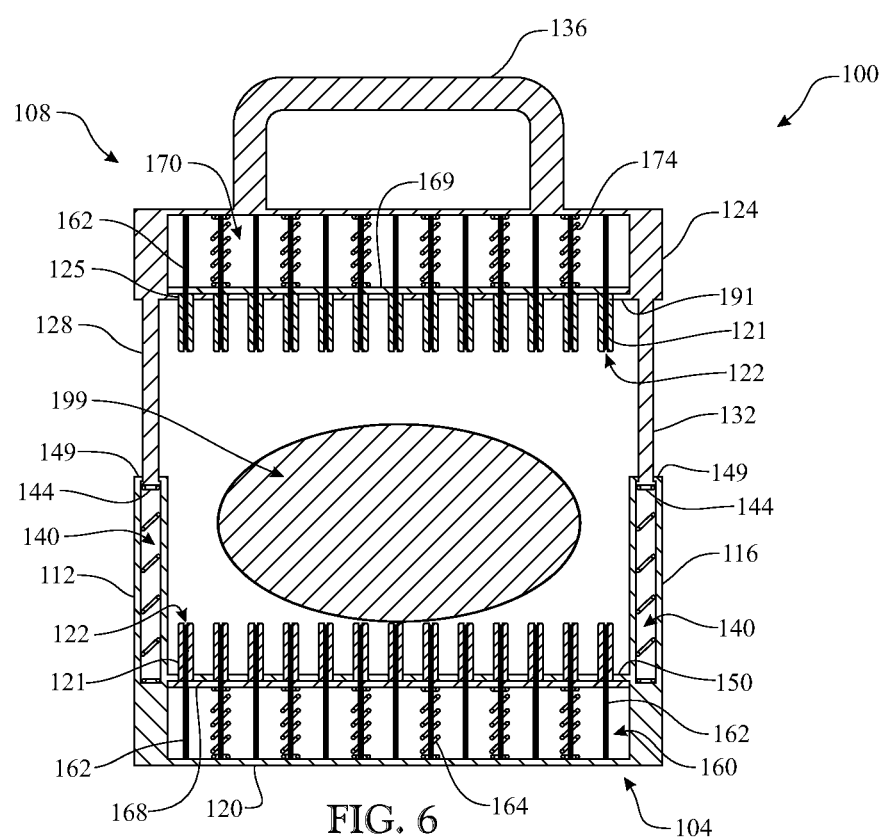
FIG. 6 presents a cross sectioned view of the potato piercer originally introduced in FIG. 1, the section being taken along a section line 6-6 of FIG. 3.

The exemplary potato piercer 100 includes a fixed base assembly 104 and a movable top assembly 108 as best presented in FIGS. 1 and 6. The base assembly 104 includes an integrally formed structure including a left vertical side 112, a right vertical side 116, and a fixed bottom plate 120, wherein the fixed bottom plate 120 is disposed between the left and right vertical sides 112, 116 forming a "U-shaped" structure.

The top assembly 108 includes a top housing 124, a plurality of left guide rods 128 (only one is shown as the others are obscured by the top housing 124), a plurality of right guide rods 132, and a handle 136. The left and right guide rods, 128 and 132 respectively, are slideably inserted into guiding bores 140 formed into the left and right vertical side walls 112, 116, respectively, as best shown in the section view presented in FIG. 6. The left and right guide rods 128, 132 are configured to have enlarged ends 144 that are bound within the upper stays 149 of the guide bores 140. The enlarged ends 144 that are bound by the upper stays 149 defining a maximum spacing between the top housing 124 and the fixed bottom plate 120. In operation, a compression force 208 (FIG. 5) is applied to the handle 136 urging the moveable top assembly 108 to move downward until a lower peripheral edge of the top housing 124 comes to rest upon upper surface 148 of the left and right vertical sides 112, 116.

The moveable top housing 124 and the fixed bottom plate 120 are both configured having an array, also referred to as a "bed of nails," assembly of piercing stakes 162. The piercing stakes 162 are sharp, pointed elongated nail-like elements arranged in a well-defined spatial configuration. Each piercing stake 162 extends a fixed distance from either the fixed bottom plate 120 or the top housing 124, and terminates in a sharp point 172.

The structure as described to this point provides a first exemplary functional potato piercer 100. In fact, the foregoing generally describes an alternative potato piercer 200 shown in FIG. 10 and described in more detail herein below. It is noted that the alternative potato piercer 200 exposes the piercing stake points 172 of the piercing stakes 162, wherein other embodiments presented herein are enhancements which conceal the piercing stake points 172 until use. In addition, once a potato 199 is pierced with such a device, it can be difficult to open the potato piercer up and remove the potato 199. Essentially the piercing stakes 162 become stuck inside the body of the potato 199. There are many ways to address these scenarios including, for example, using protective features around the piercing stakes 162, or constructing the piercing stakes 162 such that they are retractable from within enclosures provided by the base assembly 104 and top assembly 108 (i.e., constructing the piercing stakes 162 such that they "pop-up" from the top and bottom assemblies 104, 108, when the handle 136 is pressed down. Another exemplary embodiment, described in more detail below, provides better detail of an implementation of the above-referenced protective features around the piercing stakes 162.

Figure 5:
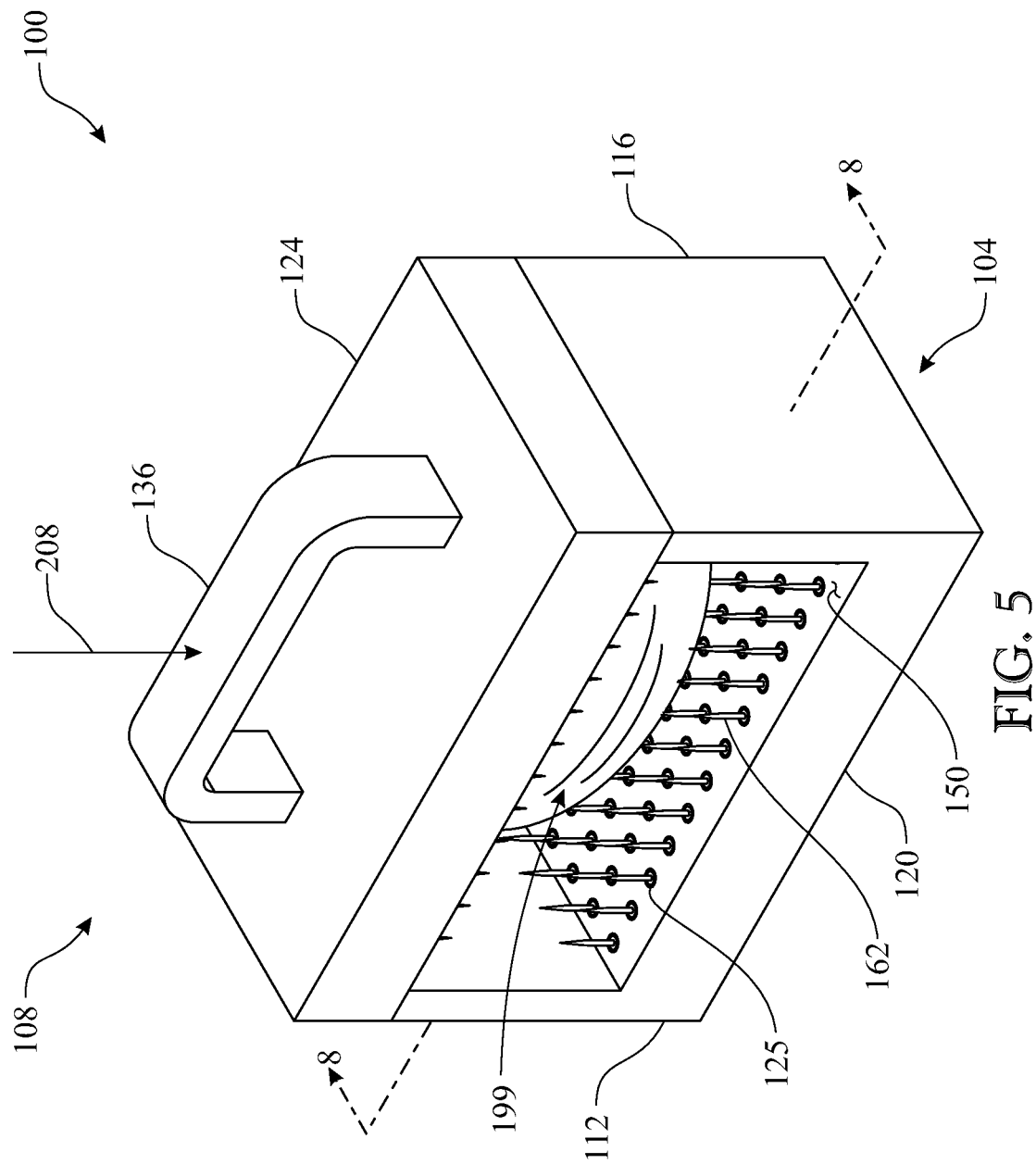
FIG. 5 presents an isometric view of the potato piercer originally introduced in FIG. 1, the illustration presenting a final step of piercing the staged potato.
Figure 7:
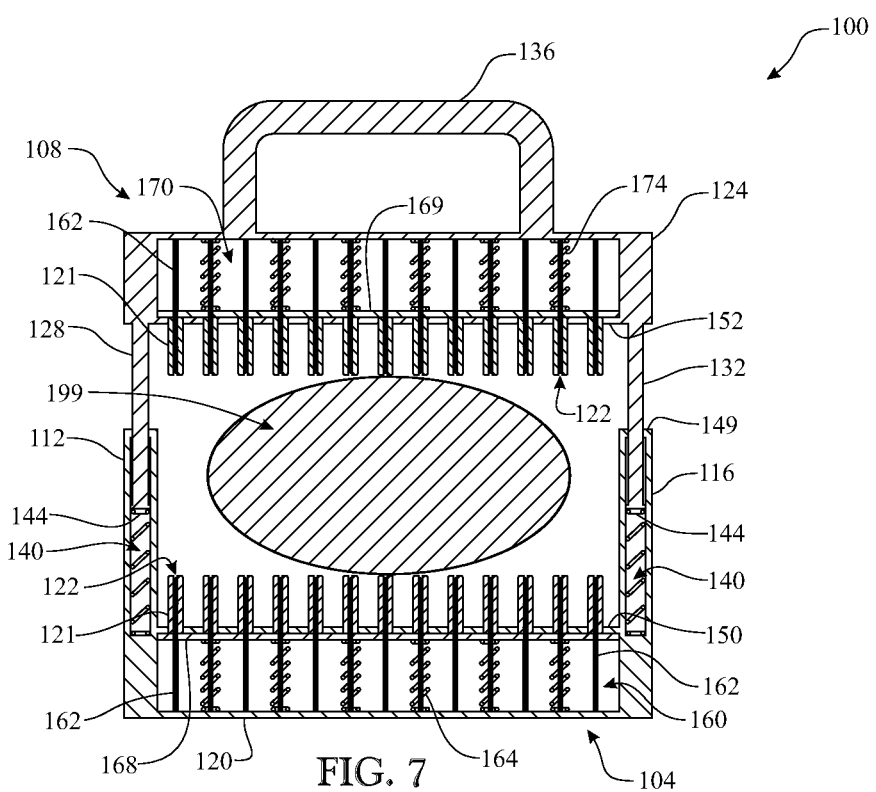
FIG. 7 presents a cross sectioned view of the potato piercer originally introduced in FIG. 1, the section being taken along a section line 7-7 of FIG. 4.
Figure 8:
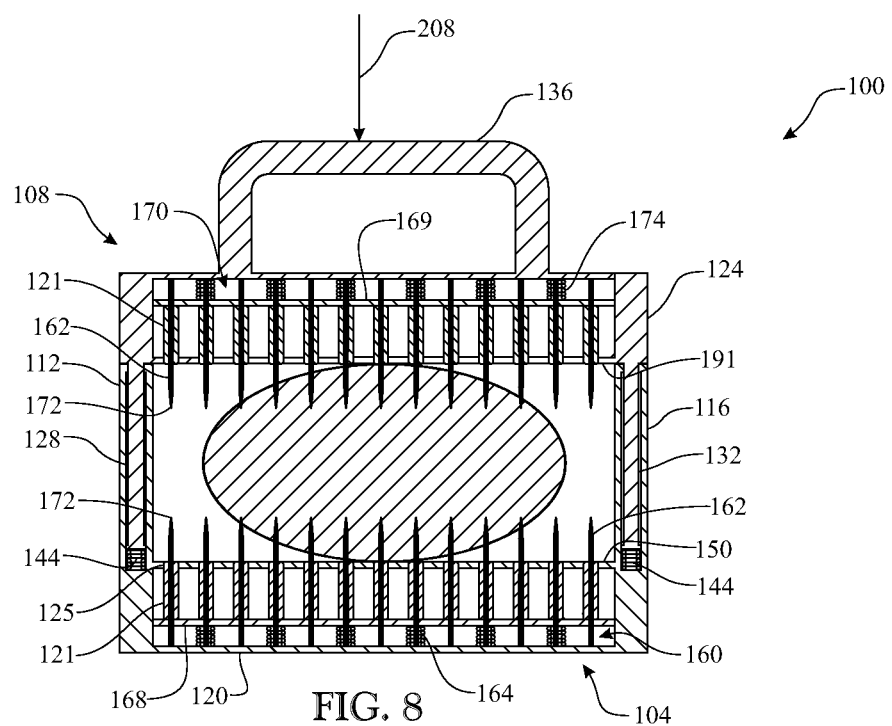
FIG. 8 presents a sectional view of the potato piercer originally introduced in FIG. 1, the section being taken along a section line 8-8 of FIG. 5.
Figure 9:
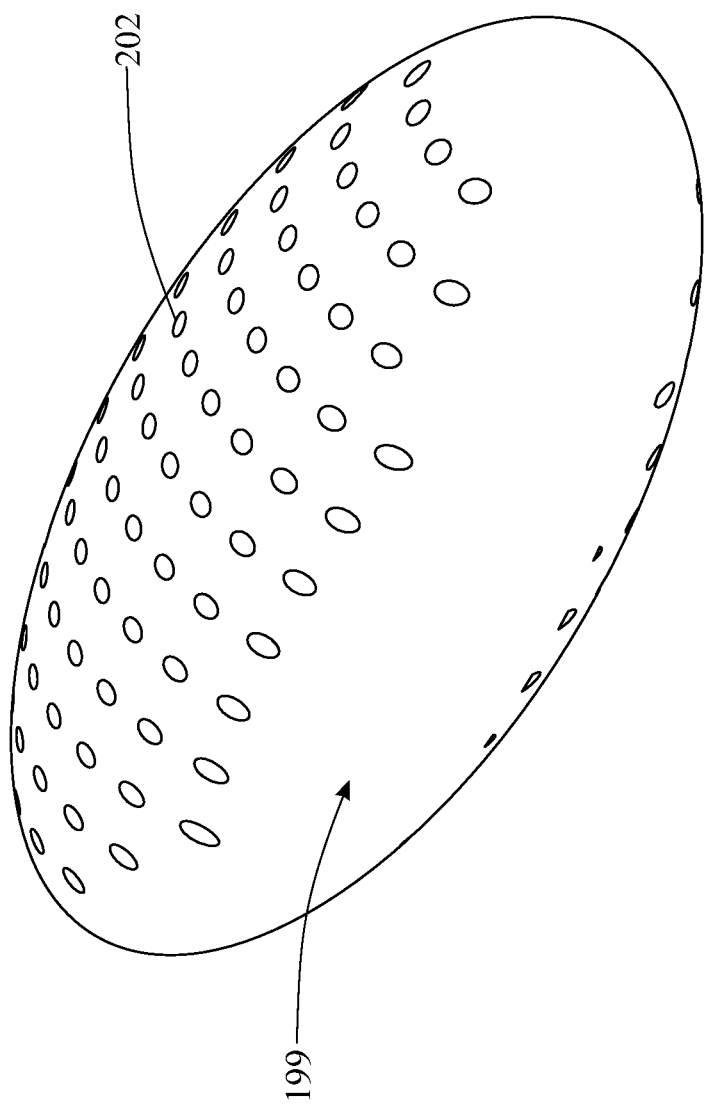
FIG. 9 presents an isometric view of a pierced potato made using the potato piercer originally introduced in FIG. 1.

The aforementioned protective features are illustrated in FIG. 1 and FIGS. 6 through 8. The fixed bottom plate 120 is fitted with a base cover 150, thereby defining a rectangular bottom cavity 160 between the fixed bottom plate 120, the base cover 150, the left vertical side 112 and the right vertical side 116. As best shown in FIGS. 5 and 8, the base cover 150 is configured with a plurality of orifices 125 through which the piercing stakes 162 can pass or extend.

Referring now primarily to FIGS. 6 through 8, a movable plate 168 is disposed between the fixed bottom plate 120 and the base cover 150, and within the bottom cavity 160. The movable bottom plate 168 is biased upwardly by a plurality of bottom springs 164 located between the movable bottom plate 168 and the fixed bottom plate 120, and they are located about the piercing stakes 162. While not all of the piercing stakes 162 need to be associated with a bottom spring 164, the design should associate a sufficient quantity of the stakes 162 and bottom springs 164 to ensure that the movable bottom plate 168 is biased sufficiently and evenly upward that the moveable plate 168 is forced into contact with the base cover 150.

Referring now primarily to FIG. 1 and FIGS. 6 through 8, the movable bottom plate 168 is configured with a plurality of vertical cylinders 121 that extend upward from the movable bottom plate 168 and through the orifices 125. Each cylinder 121 has a central bore or aperture 122 that surrounds a piercing stake 162. The cylinders 121 are dimensioned such that their tops are even with or slightly above the points 172 of the corresponding piercing stakes 162. This configuration prevents inadvertent contacting between the user and the points 172 until the movable bottom plate 168 is forced down.

The foregoing describes the configuration for protecting the bottom piercing stakes 162. Similar elements can be employed to protect the piercing stakes 162 that extend from the top housing 124. As best shown in FIGS. 6 through 8, the top housing 124 is configured having a rectangular top cavity 170 positioned above a fixed top plate 191. The fixed top plate 191 is configured with a plurality of orifices 125 through which piercing stakes 162 can be extended.

A movable top plate 169 is provided disposed within the top cavity 170. The movable top plate 169 is biased downward by a plurality of top springs 174 placed above the movable top plate 169 in the top cavity 170 and around at least some of the piercing stakes 162, to provide adequate force to bias the movable top plate 169 downward into contact with the fixed top plate 191.

Still referring to FIGS. 6 through 8, the movable top plate 169 is constructed having a plurality of vertical cylinders 121 extending downward from the movable top plate 169 and through the orifices 125. Each cylinder 121 is formed including a central bore 122. The respective piercing stake is slideably inserted through the central bore 122. Each cylinder 121 is dimensioned such that its bottom or distal surface is even with, or slightly below, the point 172 of the respective surrounded piercing stake 162. This configuration prevents undesirable human contact with the points previously described.

Figure 2:
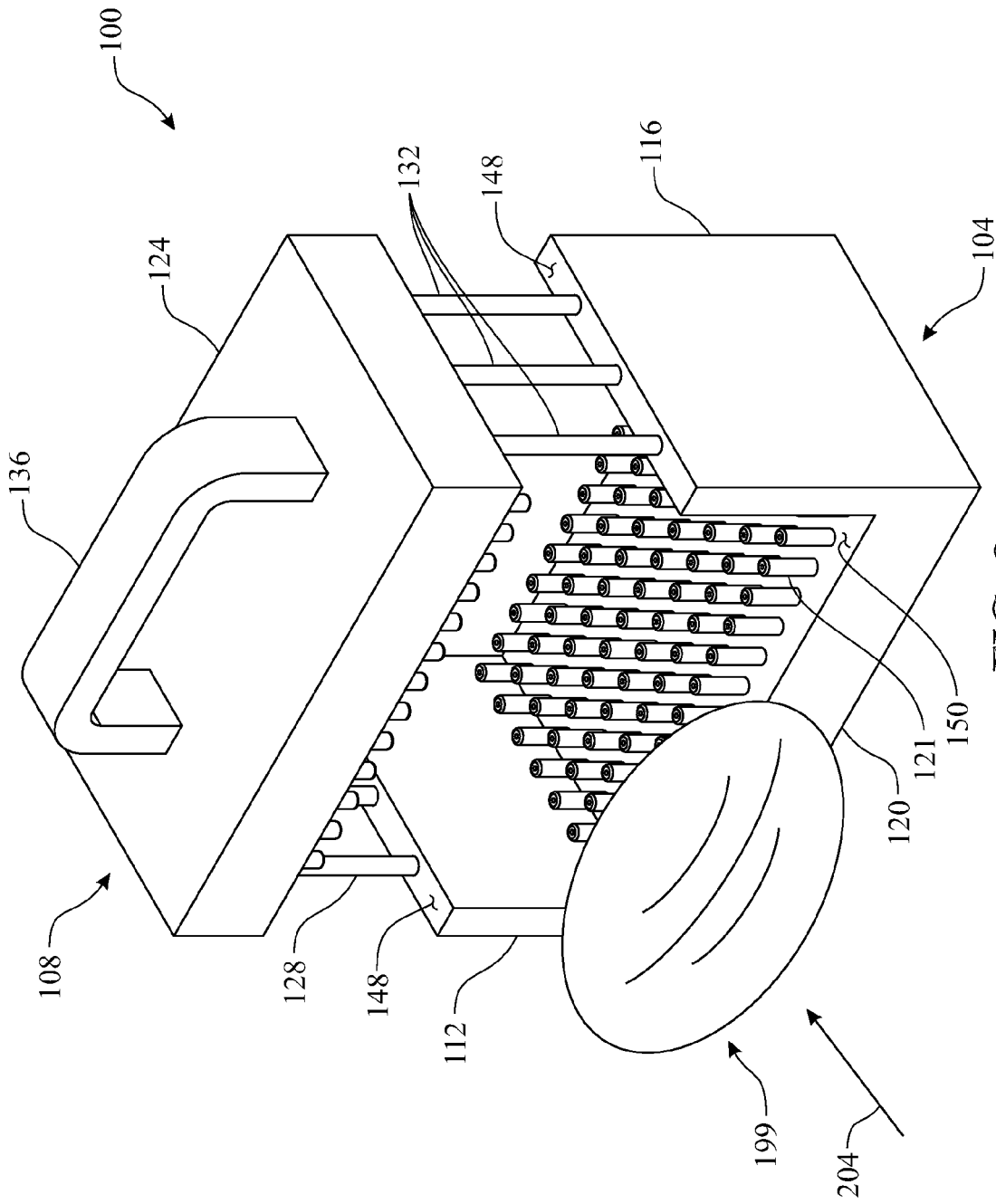
FIG. 2 presents an isometric view of the potato piercer originally introduced in FIG. 1, the illustration presenting a step of inserting a potato into the potato piercer.
Figure 3:
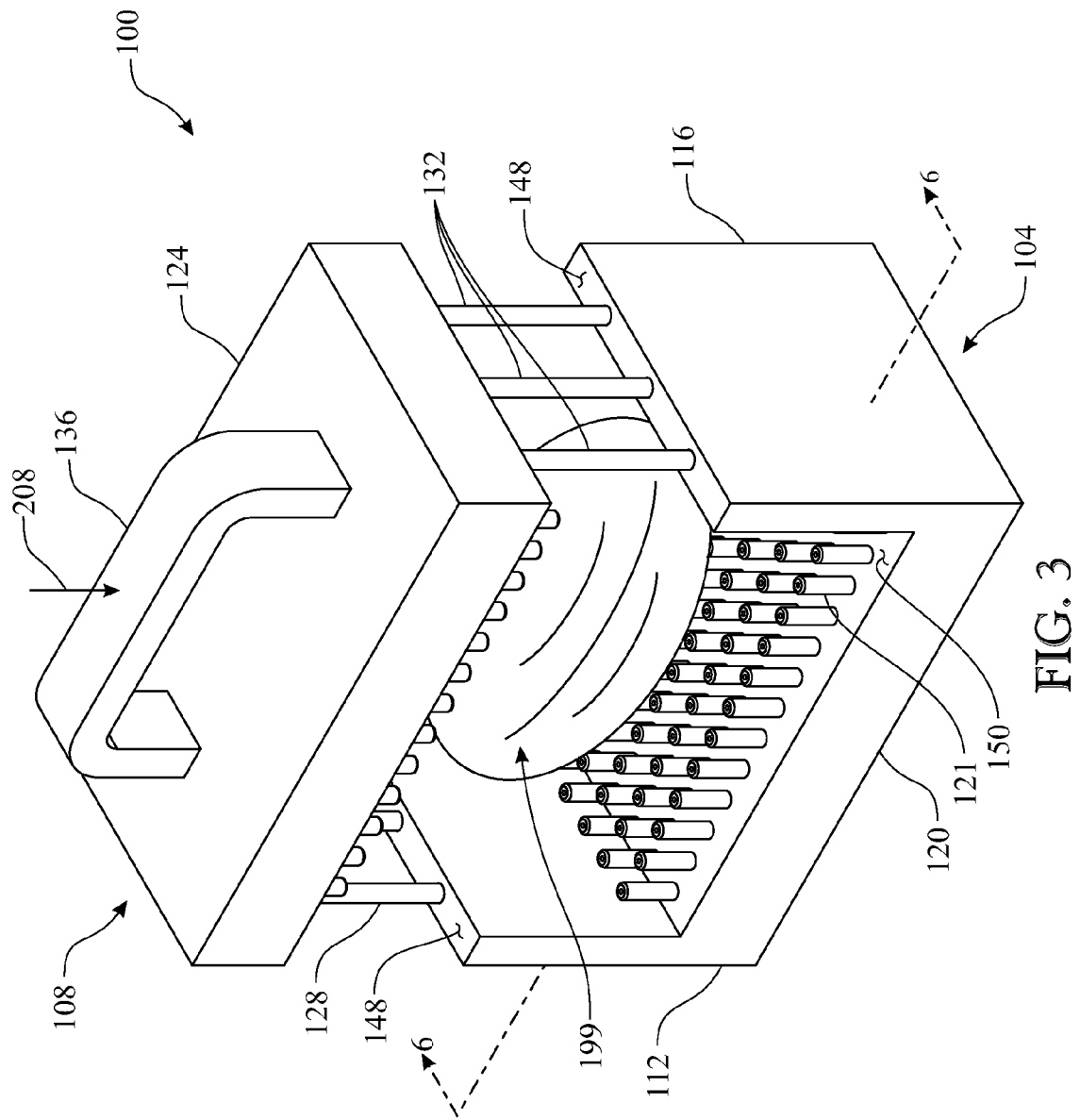
FIG. 3 presents an isometric view of the potato piercer originally introduced in FIG. 1, the illustration presenting the potato staged within the potato piercer for piercing.
Figure 4:
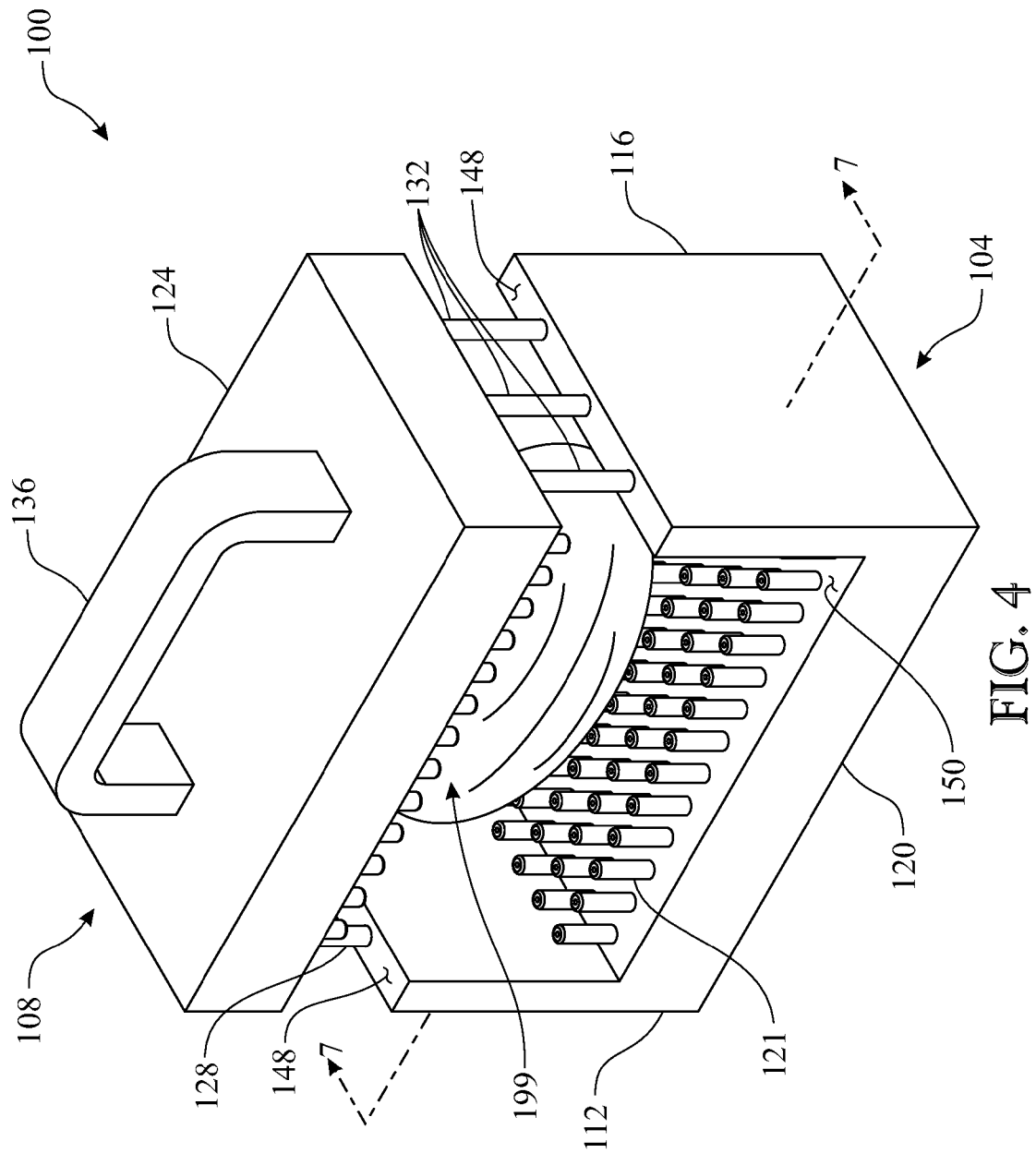
FIG. 4 presents an isometric view of the potato piercer originally introduced in FIG. 1, the illustration presenting an initial step of piercing the staged potato.

Using the potato piercer 100 is straightforward. As shown in FIG. 2, a potato 199 is placed inside the potato piercer 100 (along direction 204). Referring now particularly to FIGS. 3 and 6, the potato 199 is positioned inside the potato piercer 100. A vertically-applied force 208, which is subsequently applied to the handle 136, urges the top assembly 108 to move vertically downward toward the base assembly 104. The motion of the top assembly 108 is guided by the sliding motion of the left guide rods 128 and the right guide rods 132 vertically downward into the guide bores 140.

Referring now to FIGS. 7 and 8, as the top assembly 108 moves downward the cylinders 121 that extend from the movable top plate 169 come into contact with the potato 199. Further downward movement of the movable top plate 169 causes both the movable top plate 169 and the movable bottom plate 168 to compress their associated springs 174 and 164, respectively, and thus to move away from the points 172. This exposes the points 172 of the piercing stakes 162, forcing the piercing stakes 162 into the potato 199.

Referring now primarily to FIGS. 5 and 8, the potato piercer 100 is shown in a closed or compressed position. In this closed position, the top assembly 108 engages with the upper surfaces 148 of the base assembly 104, limiting the depth of penetration of the piercing stakes 162 into the potato 199. When the direction of the force 208 is reversed, the top assembly 108 separates from the base assembly 104. When the force 208 is removed, the top springs 174 drive the movable top plate 169 downward, and the bottom springs 164 drive the movable bottom plate 168 upward. When the top assembly 108 is fully extended away from the base assembly 104, the top springs 174 will have forced the movable top plate fully downward, while the bottom springs 164 will have forced the movable bottom plate 168 fully upward. This action forces movement of the cylinders 121 in the required respective directions to protect the points 172, thereby freeing the potato 199 from the piercing stakes 162. The potato 199 can then be removed. The result is a pierced potato 199 having holes 202 as shown in FIG. 9.

Figure 10:
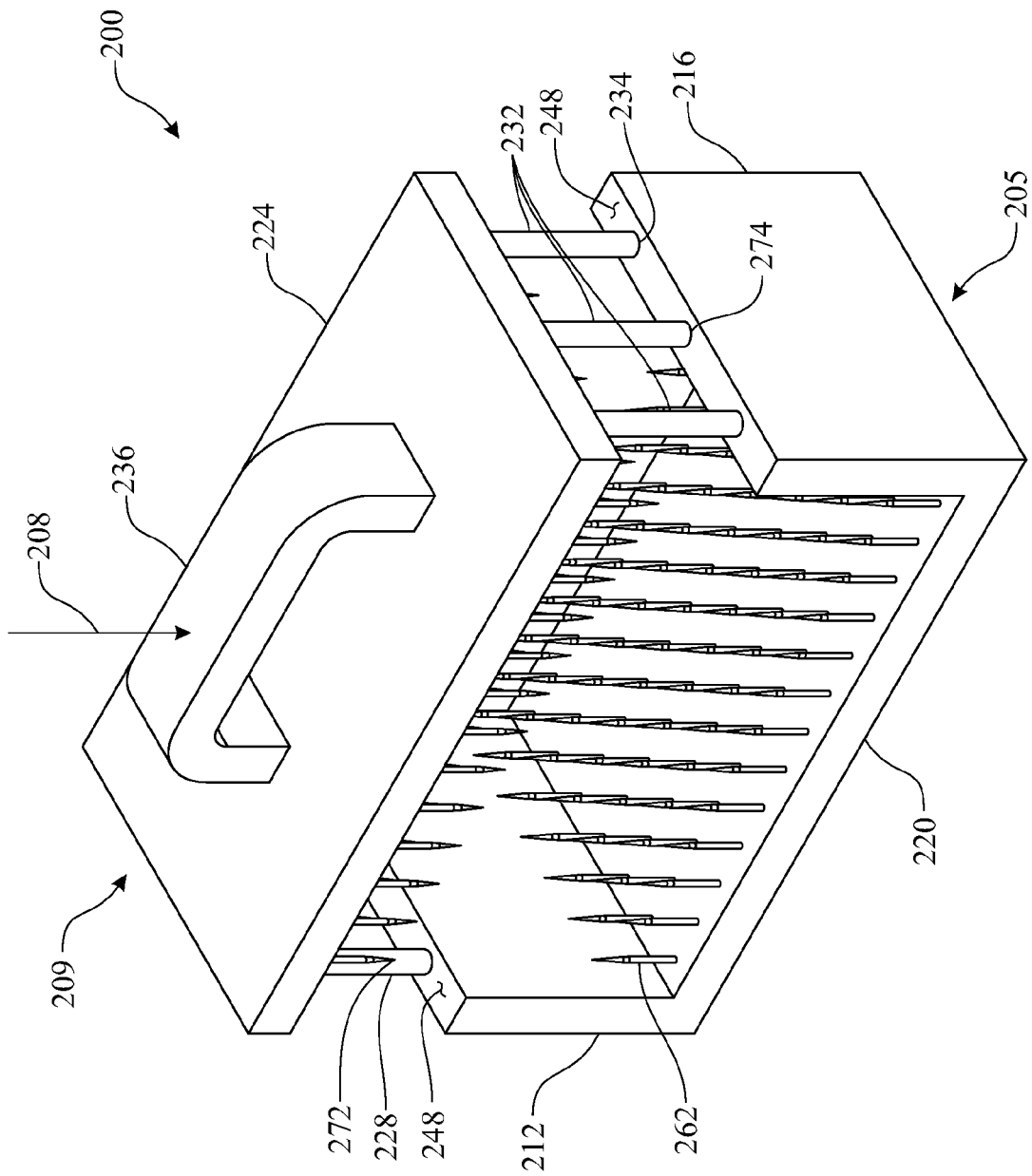
FIG. 10 presents an isometric view of a second exemplary embodiment of the present invention.

Referring now primarily to FIG. 10, a further implementation of potato piercer 200 is shown. As previously noted, this version has no safety protection nor does it automatically "free" a potato 199 after piercing. Unless otherwise stated herein, functional features of the potato piercer 200 are the same as previously described with regard to the exemplary embodiment of the potato piercer shown generally as reference numeral 100. The potato piercer 200 includes a fixed base assembly 205 and a movable top assembly 209. The base assembly 205 includes an integrally formed structure comprised of a left vertical side 212, a right vertical side 216, and a bottom plate 220 disposed between the left and right vertical sides 112, 116. The tops of the left vertical side 212 and the right vertical side 216 define upper surface 248. The top assembly 209 is comprised of a top plate 224, three left guide rods 228 (only one is shown as the others are obscured by the top plate 224), three right guide rods 232, and a handle 236. The left guide rods 228 and the right guide rods 232 fit into guide bores (not illustrated in FIG. 10 but functionally identical to guide bore 140) in a left vertical side 212 and a right vertical side 216, respectively (see below).

The left guide rods 228, the right guide rods 232, the upper surfaces 248, the guide bores, the left vertical side 212, and the right vertical side 216 are respectively similar to the previously described and illustrated left guide rods 128, right guide rods 132, upper surfaces 148, guide bores 140, left vertical side 112, and right vertical side 116. Therefore, the left guide rods 228 and the right guide rods 232 are configured to have enlarged ends that do not slide out of the guide bores (reference may be had to similar elements in the preferred embodiment potato piercer 100 shown in FIGS. 6-8). The left guide rods 228 and the right guide rods 232 define a maximum separation between the top plate 224 and the bottom 220. When the handle 236 is urged completely downward, the top plate 224 drops down to rest on the upper surfaces 248.

The top plate 224 and the bottom 220 are both configured with a "bed of nails" assembly of piercing stakes 262. The piercing stakes 262 are sharp, pointed nail-like elements arranged in a well-defined spatial configuration. Each piercing stake 262 extends a fixed distance from either the bottom 220 or the top plate 224 and terminates at a point 272.

Using the alternative embodiment potato piercer 200 is straightforward. A potato 199 is placed inside the potato piercer 200. The user applies a vertical force 208 to the handle 236. The vertical force 208 urges the top assembly 209 to move vertically downward toward the base assembly 205. The motion of the top assembly 209 is guided by the left and right guide rods 228, 232 slideably moving into the guide bores 234. The motion of the top assembly 209 is limited by engagement between opposing surfaces. When the top assembly 209 rests on the upper surface 248 of the base assembly 205 the piercing stakes 262 have pierced the potato 199. When the direction of the force 208 is reversed the top assembly 209 separates from the base assembly 205. When the top assembly 209 is fully extended away from the base assembly 205 the now pierced potato 199 having holes 202 can be removed from the piercing stakes 262. The result is a pierced potato 199 as shown in FIG. 9.

Figure 11:
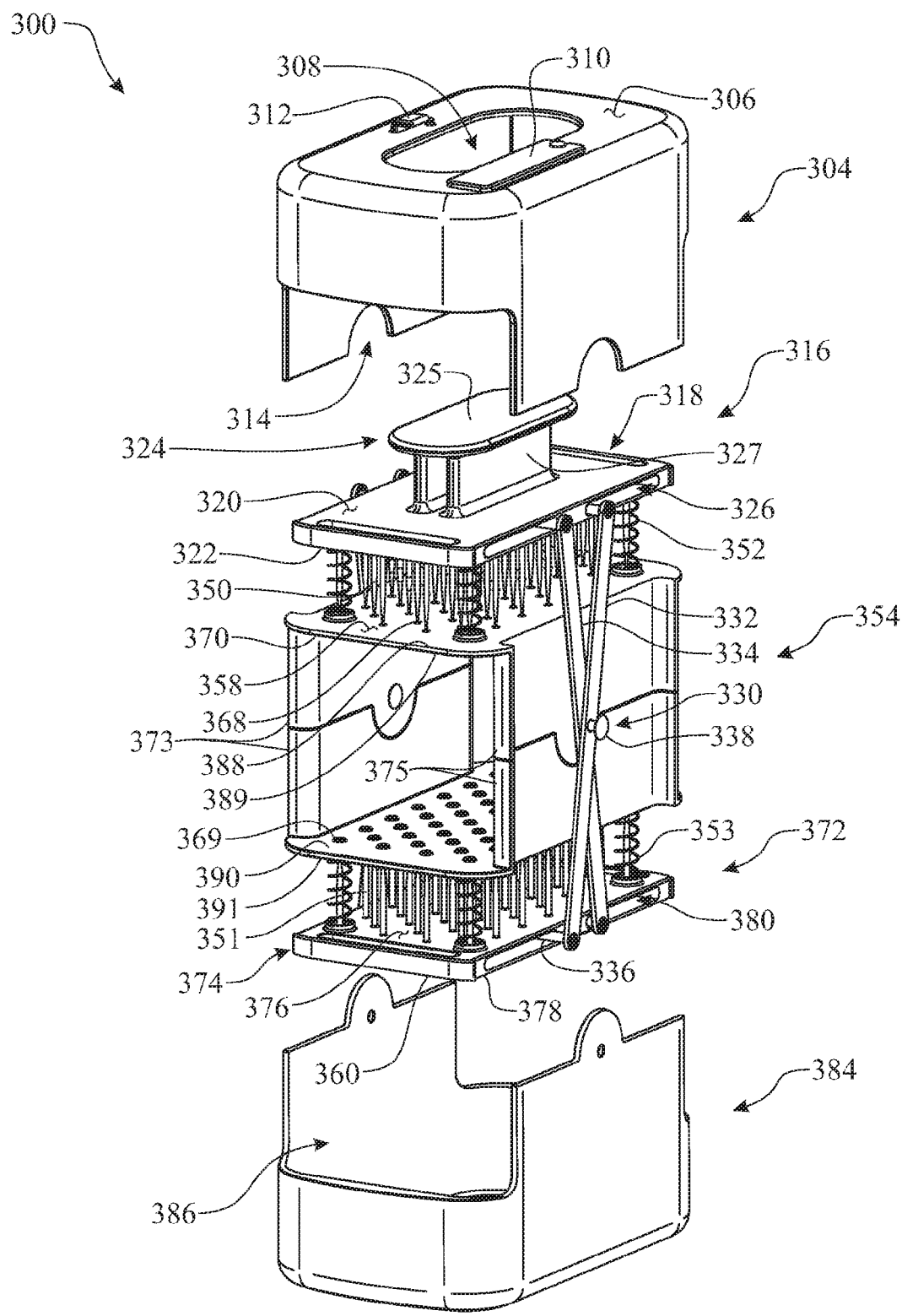
FIG. 11 presents a partially exploded isometric view of a third exemplary embodiment of the present invention.

The third alternative embodiment potato piercer 300 is illustrated in FIGS. 11-16. With reference to FIG. 11, an exploded view of the potato piercer 300 is presented. The potato piercer 300 comprises a potato piercer housing 302 enclosing a top plate assembly 316 and a bottom plate assembly 372, both of which are attached to the top and bottom, respectively, of a potato housing 354. Each of the top plate assembly 316 and the bottom plate assembly 372 are operatively coupled to an actuator assembly 330 located on opposing sides of the potato housing 354, the opposing actuator assemblies 330 facilitating the piercing movement.

The potato piercer housing 302 is formed by coupling a top housing member 304 to a bottom housing member 384. The top housing member 304 comprises a top housing member top surface 306 having a top housing member aperture 308 therethrough. The top housing member aperture 308 is sized and shaped such that a top handle 324 may pass through the aperture 308. A safety lever 310 is pivotally attached to the top surface 306 via a safety lever pivot pin 311. The safety lever 310 may be an elongated rectangular shape that is longer than the width of the aperture 308. A safety lever receptacle 312 is configured to receive an end of the safety lever 310. The safety lever 310 may be considered a male attachment device and the safety lever receptacle 312 may be considered a female attachment device, wherein attachment of the devices 310, 312 prevents accidental activation of the potato piercer 300. It is understood that the safety lever 310 and mating receptacle 312 may be configured in a number of ways that are well-known in the art and that the present disclosure merely discloses an exemplary implementation for illustrative purposes. The top housing member 304 defines a top housing member cavity 314, which is sized and shaped to receive the top plate assembly 316 and the top half of the potato housing 354.

The top plate assembly 316 is comprised of a first plate 318 having a first plate top surface 320. The first plate 316 is planar and rectangular-shaped. Extending vertically from the top surface 320 is the first plate handle 324. The first plate handle 324 may have a base 327 comprising two elongated legs, extending vertically from the top surface 320 and generally perpendicular to the top surface 320. Attached to the base 327 is a grip segment 325 configured to allow a user's hand to grip, for applying a downward pressure 392 on a top surface 328 of the handle 325 in order to actuate the piercing functionality. The grip segment 325 may be substantially flat, being parallel to the top surface 320 of the first plate 318 and may be generally oval-shaped. The first plate 318 comprises one or more first plate grooves 326, preferably four grooves 326 positioned at each corner of the first plate 318, the grooves 326 defining recesses or receptacles for receiving an attachment member of the actuator assembly 330. The attachment member may be a tongue 336 configured to be inserted into the groove 326. Each first plate groove 326 may form an elongated cavity for allowing the tongue 336 to move from one end of the cavity to another end of the cavity, when the user applies pressure 392 to the grip segment 325. A plurality of first-plate piercing members 350 extend downwardly from the bottom surface 322 of the first plate 318. The first-plate piercing members 350 may be stakes, spikes, or any other piercing device that is able to pierce through a potato 199. The piercing members 350 are elongated members having a sharpened distal end or sharp pointed end 348 and oriented with the sharp pointed end 348 directed towards a central region of the housing cavity 356. There is a plurality of first-plate biasing members 352, such as a compression springs, preferably one biasing member 352 positioned at each corner of the first plate 318. The first plate biasing member 352 bears against the bottom surface 322 of the first plate 318 and a top surface 358 of the potato housing 354, biasing the top plate assembly 316 away from the potato housing 354 such that when downward pressure 392, applied to the handle 324, is released, the handle 324 is automatically returned to a non-piercing configuration 347. In the non-piercing configuration 347, the handle 324 is positioned above the top housing member 304, through the top housing member aperture 308, and the first-plate piercing members 350 are positioned exterior to the potato housing 354, above and away from the potato 199.

The bottom plate assembly 372 is constructed similar to the top plate assembly 316, being the counterpart of the top plate assembly 316, with the exception that the bottom plate assembly 372 does not comprise a handle 324. While the top plate assembly 316 is positioned above the potato housing 354, the bottom plate assembly 372 is positioned below the potato housing 354. The bottom plate assembly 372 is comprised of a second plate 374 having a second plate top surface 376. The second plate 374 is planar and rectangular-shaped. The second plate 374 comprises one or more second plate grooves 380, preferably four grooves 380 positioned at each corner of the second plate 380, the grooves 380 defining recesses or receptacles for receiving an attachment member of the actuator assembly 330, wherein the attachment member may be a tongue 336 configured to be inserted into the groove 380. The second plate groove 380 may form an elongated cavity for allowing the tongue 336 to move from one end of the cavity to another end of the cavity, when the user applies downward pressure 392 to the handle 324 in the top plate assembly 316. A plurality of second-plate piercing members 351 extend upwardly from the top surface 376 of the second plate 374. The piercing members 351 are oriented with a sharp pointed end 349 directed towards the housing cavity 356. The potato piercer 300 includes a plurality of second plate biasing members 353. The biasing members can be provided in any suitable arrangement. In the exemplary embodiment, one biasing member 353 is positioned at each corner of the second plate 374. Each second plate biasing member 353 bears against the top surface 376 of the second plate 374 and a bottom surface 378 of the potato housing 354, biasing the potato housing 354 away from the bottom plate assembly 372 such that when downward pressure 392, applied to the handle 324, is released, the potato housing 354 is returned to a non-piercing configuration 347. In the non-piercing configuration 347, the potato housing 354 is positioned above the uppermost end of the second-plate piercing members 351 that are attached to the second plate 374, such that the piercing members 351 are exterior to the potato housing 354.

The potato housing 354 comprises a first wall 370 defining a roof, a second wall 371 defining a floor, and a pair of opposite side walls 373, 375 extending between and interconnecting the first wall (roof) 370 and second wall (floor) 371 in a fixed relationship so as to form the housing cavity 356 having at least one and preferably a pair of opposite openings 367, each of the housing cavity 356 and the opposite openings 367 thereto being configured to have a fixed size and shape, for a user to move a potato 199 through either of the openings 367 into the housing cavity 356 for staging therein to be pierced and from the housing cavity after being pierced, without changing the fixed relationship of the first, second and opposite side walls of the potato housing. The first wall 370 includes a first-wall first side 388, a first-wall second side 389, and a plurality of first-wall through-going apertures 368 from the first-wall first side 388 to the first-wall second side 389. The second wall 371 includes a second-wall first side 390, a second-wall second side 391, and a plurality of second-wall through-going apertures 369 from the second-wall first side 390 to the second-wall second side 391. The piercing apertures 368 and 369 are sized, shaped, and configured to allow the piercing members 350 and 351, respectively, to pass through the potato housing 354 in order to pierce the potato 199 housed therein. Each of the plurality of first-wall through-going apertures 368 is adapted to receive each of the plurality of first-plate piercing members 350, respectively, such that each of the plurality of first-plate piercing members 350 is able to slide through each of the plurality of first-wall through-going apertures 368 when the actuator assembly 330 is moved between the first position 347 and the second position 346. Each of the plurality of second-wall through-going apertures 369 is adapted to receive each of the plurality of second-plate piercing members 351 such that each of the plurality of second-plate piercing members 351 is able to slide through each of the plurality of second-wall through-going apertures 369 when the actuator assembly 330 is moved between the first position 347 and the second position 346.

The actuator assembly 330 is operatively coupled to the top plate assembly 316 and bottom plate assembly 372, the actuator assembly 330 being configured to translate the top plate assembly 316 and the bottom plate assembly 372 between a first position 347 and a second position 346. The first position 347 is a non-piercing configuration 347 wherein the plurality of first-plate 350 and second-plate piercing members 351 are positioned exterior to the housing cavity 356. The second position 346 is a piercing configuration 346 wherein the plurality of first-plate piercing members 350 are moved through the plurality of first-wall through-going apertures 368 and the second-plate piercing members 351 are moved through the plurality of second-wall through-going apertures 369, such that the plurality of piercing members 351, 352 are positioned within the cavity 356, piercing a potato 199 contained therein.

The actuator assembly 330 may include a first link arm 332 and a second link arm 334, pivotally connected by a pivot pin 338 that is centrally positioned along the length of each link arm 332, 334. One tongue 336, defining a rod-shaped member, may be attached at each end of each link arm 332, 334. Each tongue 336 is inserted into a corresponding groove 326, 380 for operatively coupling the actuator assembly 330 to the plate assemblies 316, 372. The potato piercer 300 comprises one actuator assembly 330 on each opposing side of the potato housing 354.

Figure 12:
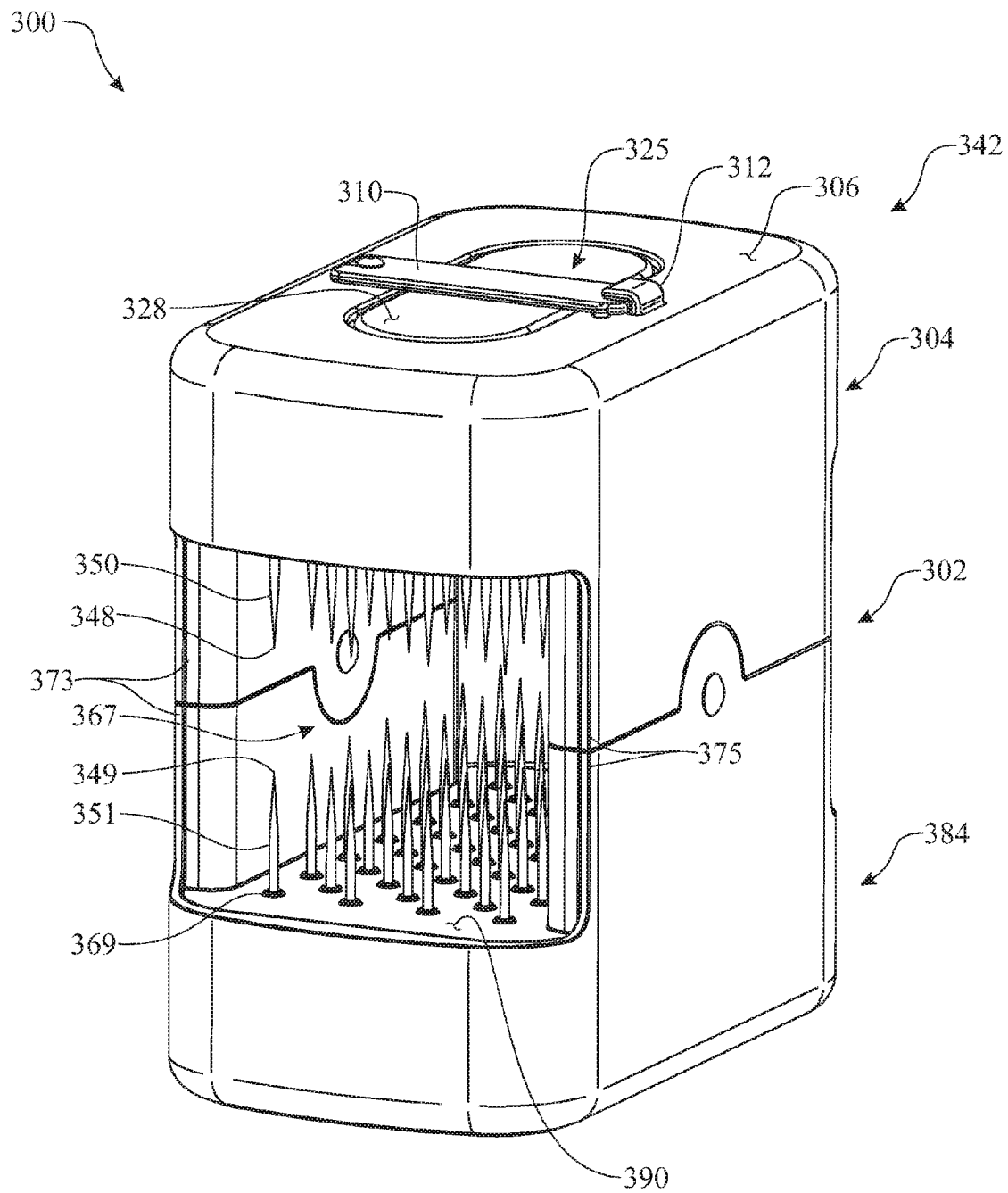
FIG. 12 presents an assembled isometric view of the third exemplary embodiment originally introduced in FIG. 11, the illustration presenting the potato piercer in a locked configuration.
Figure 13:
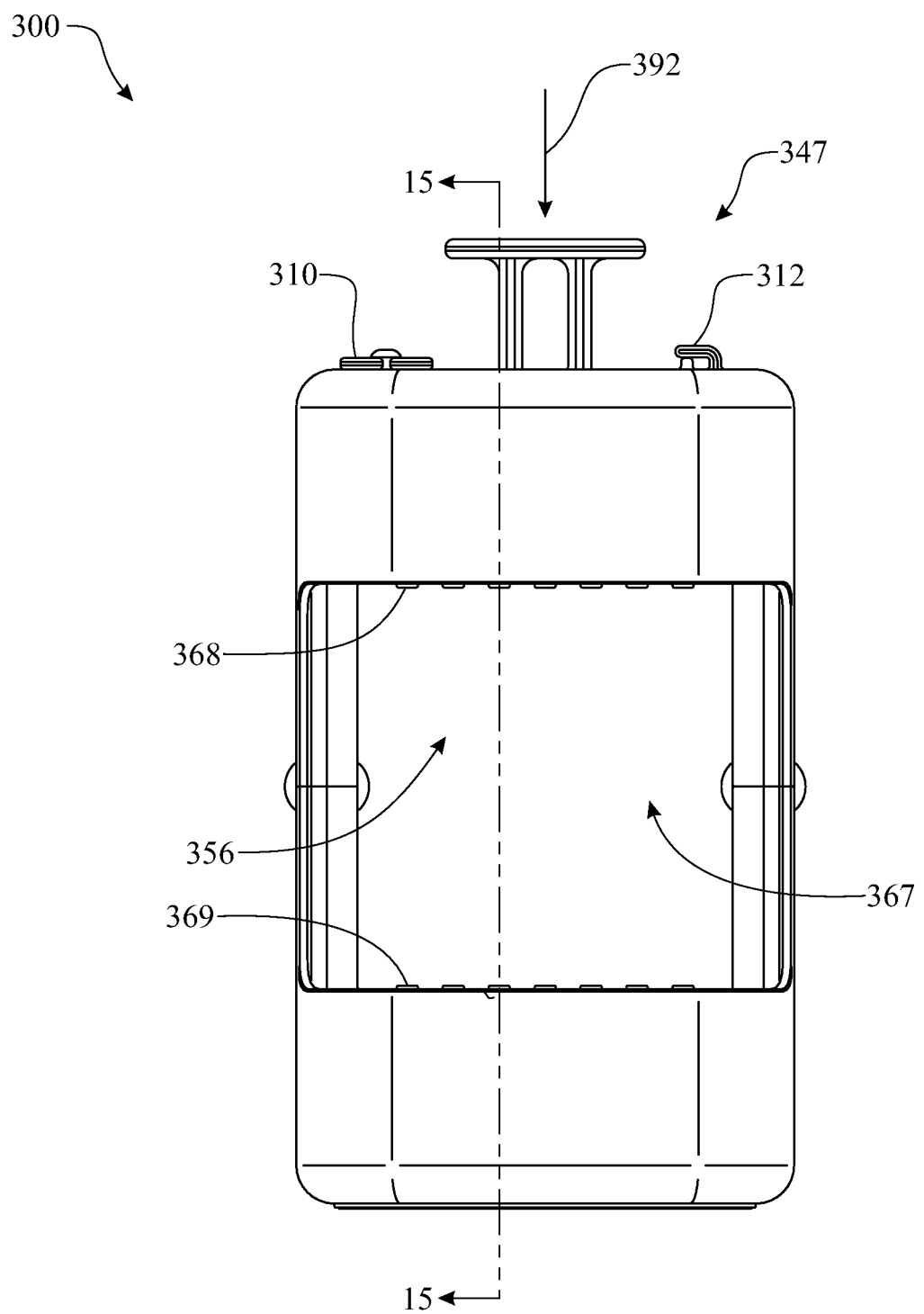
FIG. 13 presents a front elevation view of the third exemplary embodiment originally introduced in FIG. 11, the illustration presenting the potato piercer in an unlocked configuration.
Figure 14:
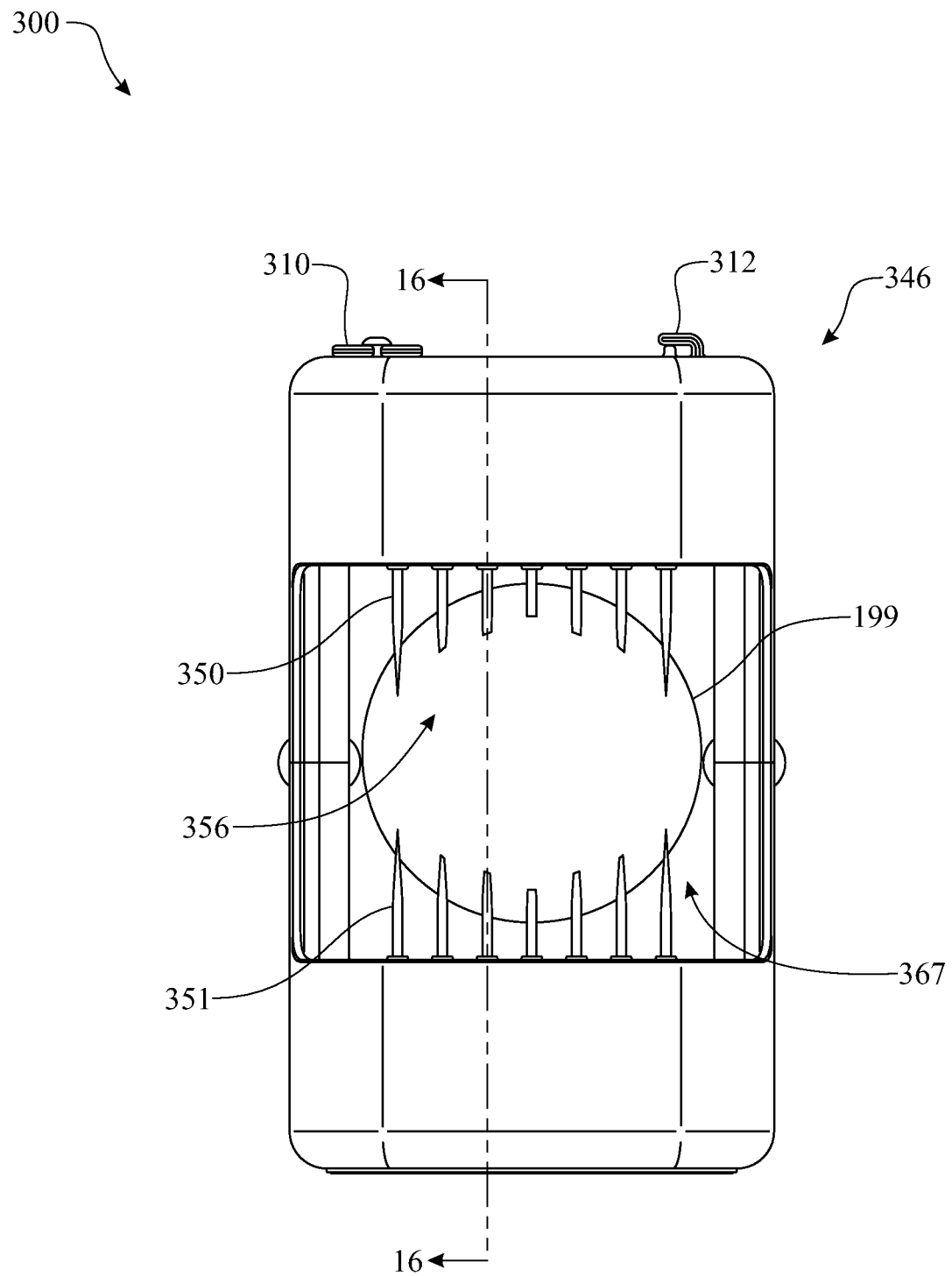
FIG. 14 presents a front elevation view of the third exemplary embodiment originally introduced in FIG. 11, illustrating the potato piercer piercing a potato.
Figure 15:
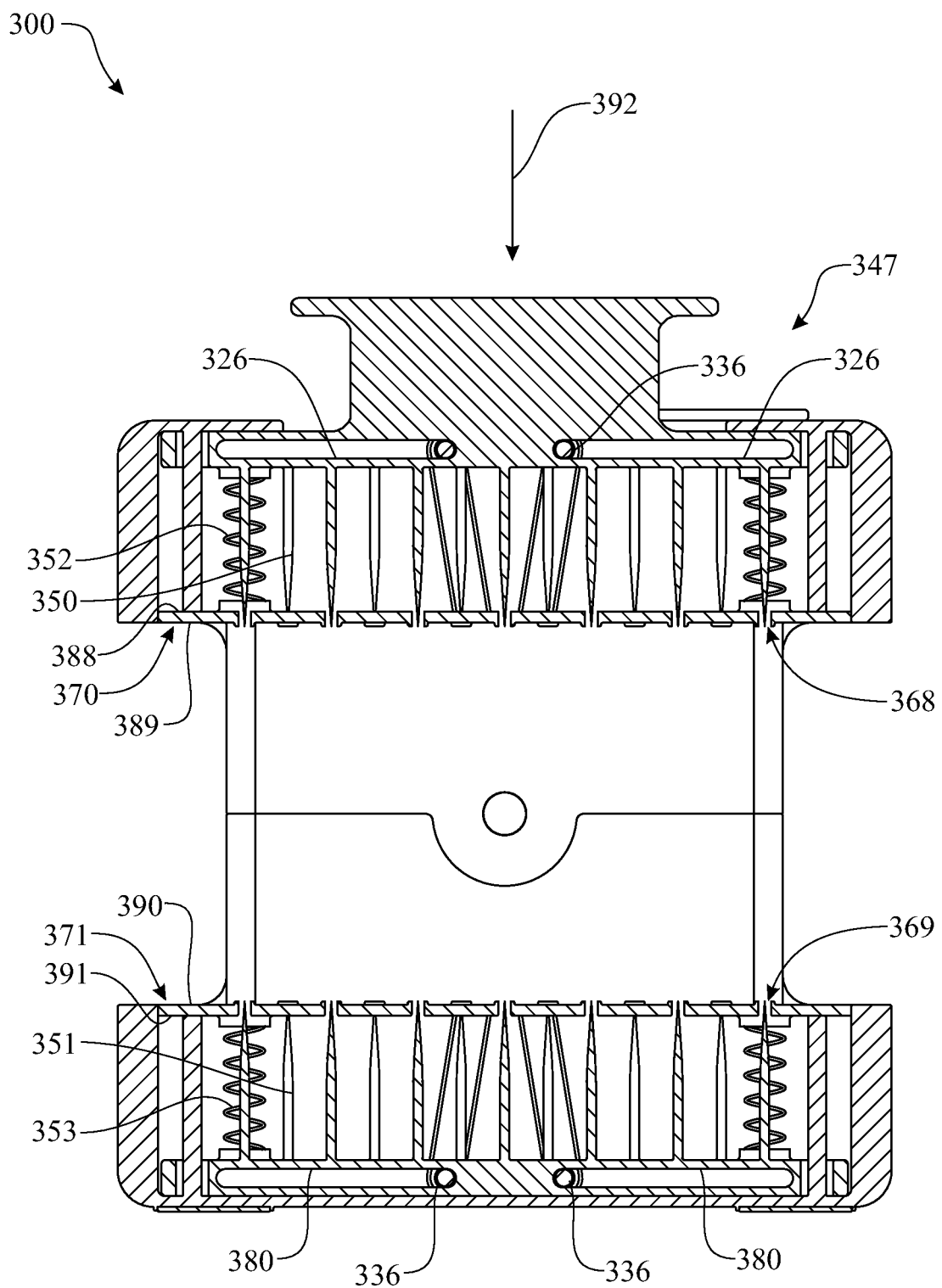
FIG. 15 presents a sectioned elevation side view of the potato piercer, the section being taken along section line 15-15 of FIG. 13.
Figure 16:
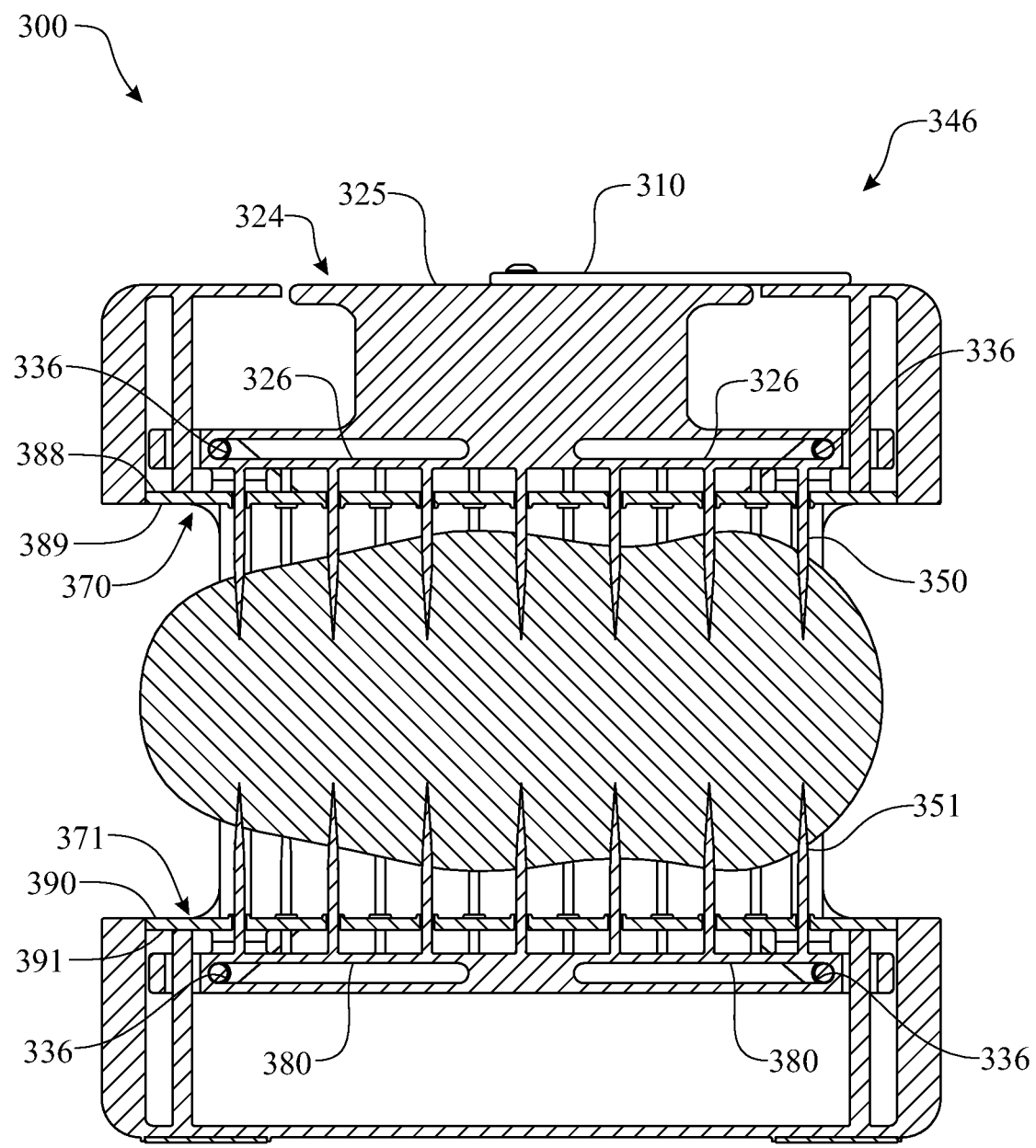
FIG. 16 presents a sectioned elevation side view of the potato piercer, the section being taken along section line 16-16 of FIG. 14.

In use, the potato piercer 300 is preferably stored in a locked configuration 342, as illustrated in FIG. 12. In the locked configuration 342, the safety lever 310 is positioned within the safety lever receptacle 312 such that the safety lever 310 extends over the opening of the top housing member aperture 308 and over the top surface 328 of the handle 324 to prevent accidental activation of the potato piercer 300. The placement of the safety lever 310 in the locked configuration 342 maintains the downward pressure 392 on the handle 324, such that the piercing members 350, 351 pass through the piercing apertures 368, 369 into the potato housing cavity 356. When the user desires to pierce the potato 199, the user will move the safety lever 310 such that it does not extend over the top surface 328 of the handle 324, as illustrated in FIG. 13. Upon removal of the safety lever 310, the biasing force of the biasing members 352, 353 cause the handle 324 to automatically rise above the top housing member 304 and cause the piercing members 350, 351 to be positioned exterior to the potato housing 354 in the non-piercing configuration 347, as illustrated in FIGS. 13 and 15. With the opening 367 of the potato housing cavity 356 cleared of piercing members 350, 351 the user may place the potato 199 within the cavity 356. The user may then apply a downward force or pressure 392 to the handle 324, causing the actuator assembly tongues 336 to move outwardly toward the outer edges of the plates 316, 374, as the link arms 332, 334 pivot about the pivot pins 338. This causes the piercing members 350, 351 to pass through the piercing apertures 368, 369 piercing the potato 199, as illustrated in FIGS. 14 and 16.

The above-described embodiments are merely exemplary of implementations possible given a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A food piercing apparatus, comprising:
   a food item housing comprising:
      a plurality of walls interconnected to one another in a fixed relationship so as to form a housing cavity and at least one opening to the housing cavity, wherein the housing cavity is configured having a fixed size and shape for staging a food item therein and also wherein the opening to the housing cavity is configured having a fixed size and shape for a user to move the food item through the opening into and from the housing cavity, without changing the fixed relationship of the walls of the housing, and
      at least one of the plurality of walls having a plurality of piercing member receiving apertures passing therethrough, wherein the piercing member receiving apertures are located in a spatially arranged pattern;
   a plate assembly comprising a plate having a planar surface and a plurality of piercing members extending from the planar surface in a spatially arranged pattern, wherein each piercing member is provided in registration with a respective piercing member receiving aperture, and also wherein the piercing members are substantially parallel with one another; and
   an actuator assembly operatively coupled to the plate assembly, the actuator assembly being configured to translate the plate assembly between a first position and a second position, the first position being a non-piercing configuration wherein the plurality of piercing members are positioned externally of the housing cavity and the second position being a piercing configuration wherein the plurality of piercing members are urged through the plurality of piercing member receiving apertures, such that a majority of a length of each of the plurality of piercing members are positioned within the cavity.

2. The food piercing apparatus as recited in claim 1, wherein the spatially arranged pattern of the plurality of piercing member receiving apertures and the spatially arranged pattern of the plurality of piercing members are the same.

3. The food piercing apparatus as recited in claim 2, wherein each of the plurality of piercing members is fabricated of an elongated member having a sharpened distal end, wherein the sharpened distal end is oriented in the direction of a central region of the housing cavity.

4. The food piercing apparatus as recited in claim 1, the plate assembly further comprises a grip, wherein, during operation of the food piercing apparatus, a force applied to the grip urges the plate assembly to move from the first position to the second position.

5. The food piercing apparatus as recited in claim 4, wherein the grip is in the form of a handle.

6. The food piercing apparatus as recited in claim 4, further comprising a biasing member positioned between the plate of the plate assembly and the at least one wall of the food item housing having the plurality of piercing member receiving apertures passing therethrough, wherein the biasing member biases the plate assembly away from the food item housing such that when the force is removed from the grip when the plate assembly is in the second position, the plate assembly is automatically returned to the first position.

7. The food piercing apparatus as recited in claim 6, wherein the biasing member is at least one spring.

8. The food piercing apparatus as recited in claim 1, wherein the plurality of walls are interconnected to one another so as to form the housing cavity with a pair of opposite fixed openings thereto.

* * * * *